(12) United States Patent
Molter et al.

(10) Patent No.: US 11,959,699 B2
(45) Date of Patent: Apr. 16, 2024

(54) WATER ELECTROLYSIS AND CRYOGENIC LIQUEFACTION SYSTEM

(71) Applicants: Skyre, Inc., East Hartford, CT (US); Eta Space LLC, Rockledge, FL (US)

(72) Inventors: Trent M. Molter, South Windsor, CT (US); Robert Roy, West Springfield, MA (US); William Notardonato, Merritt Island, FL (US)

(73) Assignees: ETA SPACE LLC, Rockledge, FL (US); SKYRE, INC., East Hartford, CT (US)

( * ) Notice: Subject to any disclaimer, the term of this patent is extended or adjusted under 35 U.S.C. 154(b) by 412 days.

(21) Appl. No.: 17/188,040

(22) Filed: Mar. 1, 2021

(65) Prior Publication Data
US 2021/0270522 A1 Sep. 2, 2021

Related U.S. Application Data

(60) Provisional application No. 62/984,293, filed on Mar. 2, 2020.

(51) Int. Cl.
*F25J 1/00* (2006.01)
*B01D 53/32* (2006.01)
(Continued)

(52) U.S. Cl.
CPC ............. *F25J 1/001* (2013.01); *B01D 53/326* (2013.01); *C25B 1/04* (2013.01); *C25B 9/19* (2021.01);
(Continued)

(58) Field of Classification Search
CPC .......... F25J 1/001; F25J 1/0017; F25J 1/0067; F25J 1/0075; F25J 2205/86; F25J 1/004;
(Continued)

(56) References Cited

U.S. PATENT DOCUMENTS

| 2002/0051898 | A1* | 5/2002 | Moulthrop, Jr. | C25B 1/04 205/345 |
| 2005/0198958 | A1* | 9/2005 | Haase | F25J 3/04563 60/641.8 |

(Continued)

FOREIGN PATENT DOCUMENTS

WO WO-9008295 A * 7/1990 ............... C25B 1/02

OTHER PUBLICATIONS

International Search Report; International Application No. PCT/US2021/020210; International Filing Date: Mar. 1, 2021; dated Dec. 2, 2021; 3 pages.

(Continued)

*Primary Examiner* — Miguel A Diaz
*Assistant Examiner* — Ibrahim A. Michael Adeniji
(74) *Attorney, Agent, or Firm* — CANTOR COLBURN LLP

(57) ABSTRACT

In an aspect, a system comprises a water stream in fluid communication with an electrolyzer; the electrolyzer comprising an anode and a cathode side chamber; a deep space oxygen radiator in fluid communication with the anode side chamber of the electrolyzer; a cryogenic heat exchanger comprising an oxygen storage tank in fluid communication with the deep space oxygen radiator; an electrochemical hydrogen compressor in fluid communication with the cathode side chamber; a hydrogen storage tank in fluid communication with the electrochemical hydrogen compressor via a cooled hydrogen stream; wherein at least a portion of the cooled hydrogen stream is in a first fluid communication with an expansion valve and the cryogenic heat exchanger; wherein the hydrogen storage tank is in a second fluid communication with the electrochemical hydrogen compressor via a warmed hydrogen stream; and wherein the (Continued)

cryogenic heat exchanger is in fluid communication with the warmed hydrogen stream.

20 Claims, 2 Drawing Sheets

(51) Int. Cl.
*C25B 1/04* (2021.01)
*C25B 9/19* (2021.01)
(52) U.S. Cl.
CPC ............ F25J 1/0017 (2013.01); *F25J 1/0067* (2013.01); *F25J 1/0075* (2013.01)
(58) Field of Classification Search
CPC ........ F25J 1/0204; F25J 1/0221; F25J 1/0275; F25J 1/0279; F25J 1/0228; F25J 1/0236; B01D 53/326; C25B 1/04; C25B 9/19; C25B 1/02; C25B 15/08; C25B 15/083; Y02E 60/36; C01B 3/50
See application file for complete search history.

(56) References Cited

U.S. PATENT DOCUMENTS

| | | |
|---|---|---|
| 2009/0019886 A1 | 1/2009 | Willen et al. |
| 2010/0187128 A1* | 7/2010 | Neubert ................... C25B 15/08 205/742 |
| 2010/0272634 A1 | 10/2010 | Schwartz et al. |
| 2015/0068222 A1* | 3/2015 | Hakamada ............... F25J 1/001 62/53.2 |
| 2015/0068246 A1 | 3/2015 | Hakamade et al. |
| 2018/0319660 A1 | 11/2018 | Yates et al. |
| 2020/0141640 A1* | 5/2020 | Turney ................... F25J 1/0067 |
| 2021/0254789 A1 | 8/2021 | Lagoutte et al. |
| 2021/0270522 A1* | 9/2021 | Molter ................... F25J 1/0275 |

OTHER PUBLICATIONS

Written Opinion; International Application No. PCT/US2021/020210; International Filing Date: Mar. 1, 2021; dated Dec. 2, 2021; 6 pages.

* cited by examiner

WATER ELECTROLYSIS AND CRYOGENIC LIQUEFACTION SYSTEM

CROSS-REFERENCE TO RELATED APPLICATION

This application claims the benefit of U.S. Provisional Patent Application Ser. No. 62/984,293 filed Mar. 2, 2020. The related application is incorporated herein in its entirety by reference.

BACKGROUND

An emerging topic of extreme interest is the development of a system capable of producing liquid hydrogen and oxygen from a water feedstock, with the ability to scale to tens of metric tons/month and operate with no human involvement as such a system could be used on the lunar surface or in space. For example, recent National Space Council remarks indicate a human return to the lunar surface could happen as early as 2024. One of the key requirements for this initiative though is to enable a sustainable exploration program. Sustainability is partially enabled by using local resources as much as possible. Current plans for In-Situ Resource Utilization (ISRU) on the Moon focus on water ice presumed to be in the permanently-shadowed craters of the polar regions. If this ice could be accessed and processed, most of the consumables needed for further exploration could be locally supplied as opposed to being delivered from Earth. Water, and its oxygen and hydrogen elements, could then be used for a wide variety of space applications including drinking and cooling water, breathing oxygen, fuel cell reactants, and especially liquid oxygen and liquid hydrogen for rocket propellants. The propellant application is particularly attractive since propellants typically make up a large fraction of the lift-off mass of spacecraft and rockets, and liquid oxygen and liquid hydrogen form a particularly good chemical propellant combination that is practical to use. A liquid oxygen and liquid hydrogen refueling station on the Moon could enable refueling of ascent and descent stages, a necessary capability for reusability.

While hydrogen and oxygen liquefiers have been used on Earth for over 100 years, the local environment near the lunar poles makes these systems impractical for use in space. A system capable of producing hydrogen and oxygen from water and liquefying them for use as a propellant on the lunar surface with little to no human involvement is therefore desired.

BRIEF SUMMARY

Disclosed herein is water electrolysis and cryogenic liquefaction system.

In an aspect, a water electrolysis and cryogenic hydrogen liquefaction system, comprises a water stream in fluid communication with an anode side chamber of an electrolyzer; the electrolyzer comprising the anode side chamber, a cathode side chamber, and an electrolyzer membrane and electrode assembly located between the anode side chamber and the cathode side chamber; a deep space oxygen radiator in fluid communication with the anode side chamber of the electrolyzer via a separated oxygen stream; a cryogenic heat exchanger comprising an oxygen storage tank in fluid communication with the deep space oxygen radiator via a cooled oxygen stream; an electrochemical hydrogen compressor in fluid communication with the cathode side chamber via a separated hydrogen stream; a hydrogen storage tank in fluid communication with the electrochemical hydrogen compressor via a cooled hydrogen stream that is cooled by at least one recuperative heat exchanger and at least one deep space hydrogen radiator; wherein at least a portion of the cooled hydrogen stream is in a first fluid communication with an expansion valve and the cryogenic heat exchanger that is located downstream of the expansion valve; wherein the hydrogen storage tank is in a second fluid communication with the electrochemical hydrogen compressor via a warmed hydrogen stream that is warmed by the at least one recuperative heat exchanger; and wherein the cryogenic heat exchanger is in fluid communication with the warmed hydrogen stream via a heat-exchanged hydrogen stream.

In another aspect, a method for electrolyzing water and cryogenically forming liquid oxygen therefrom comprises directing a water stream to at least one of an anode side chamber or a cathode side chamber of an electrolyzer; the electrolyzer comprising the anode side chamber, the cathode side chamber, and an electrolyzer membrane and electrode assembly located between the anode side chamber and the cathode side chamber; directing a separated oxygen stream from the anode side chamber of the electrolyzer to a deep space oxygen radiator; directing a cooled oxygen stream from the deep space oxygen radiator to an oxygen storage tank of a cryogenic heat exchanger; directing a separated hydrogen stream from the cathode side chamber to an electrochemical hydrogen compressor; directing a cooled hydrogen stream from the electrochemical hydrogen compressor to a hydrogen storage tank and cooling the cooled hydrogen stream in at least one recuperative heat exchanger and at least one deep space hydrogen radiator upstream of the hydrogen storage tank; expanding at least a portion of the cooled hydrogen stream in an expansion valve to form a refrigerant hydrogen stream and directing the refrigerant hydrogen stream to the cryogenic heat exchanger; directing a warmed hydrogen stream from hydrogen storage tank to the electrochemical hydrogen compressor and warming the warmed hydrogen stream via the at least one recuperative heat exchanger; and directing a heat-exchanged hydrogen stream from the cryogenic heat exchanger to the warmed hydrogen stream upstream of the electrochemical hydrogen compressor.

The above described and other features are exemplified by the following figures, detailed description, and claims.

BRIEF DESCRIPTION OF THE DRAWINGS

The following Figures are exemplary embodiments, which are provided to illustrate the present disclosure.

DETAILED DESCRIPTION

Figure 1:
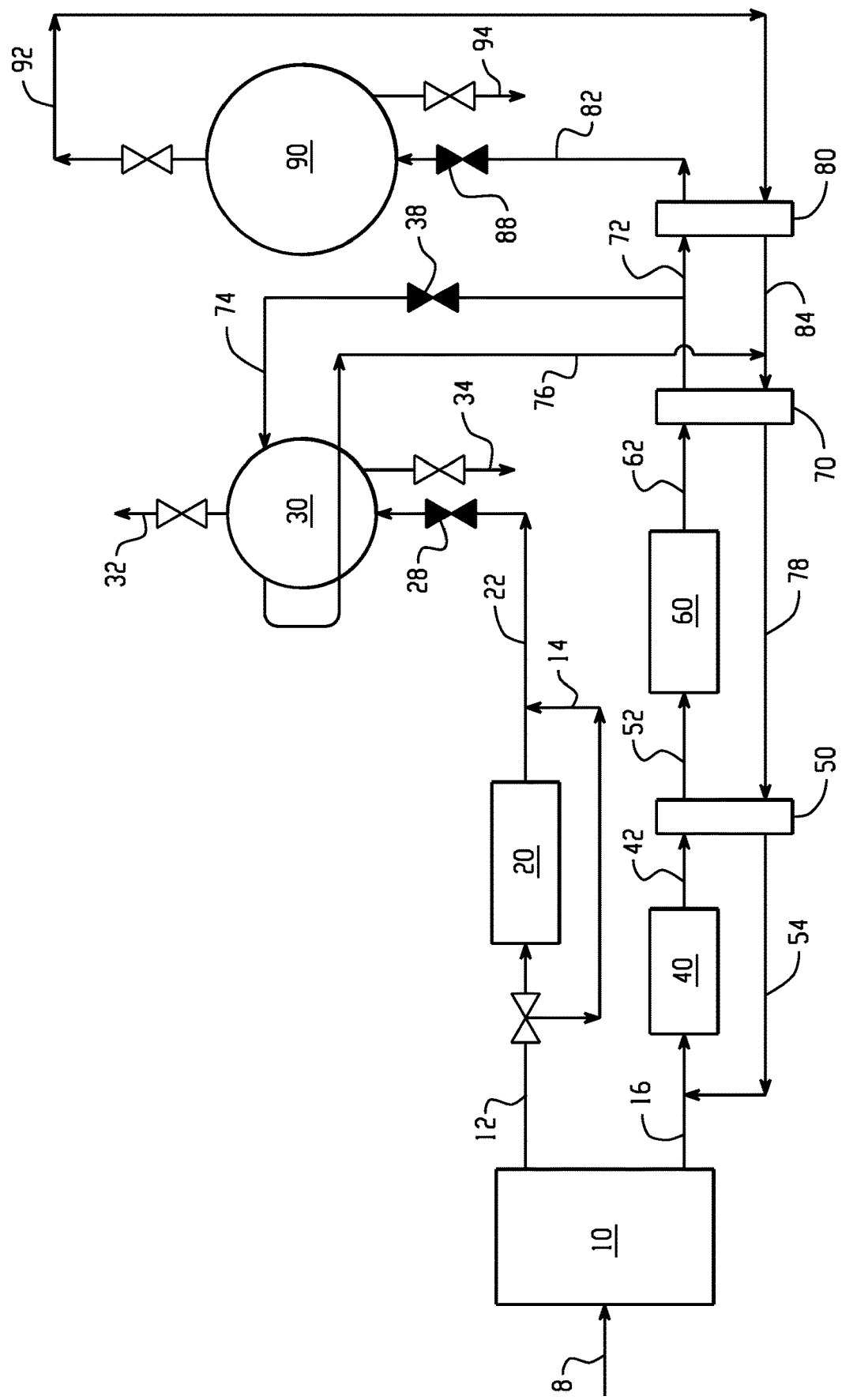
FIG. 1 is an illustration of an aspect of a water electrolysis and cryogenic liquefaction system.

A system and method for producing liquid oxygen from water is desired that can be used on the Moon. While many processes are available for hydrogen production on Earth, each comes with significant drawbacks for use on the Moon. For example, steam methane reformation and coal gasification require hydrocarbon feedstocks. Biological processes such as microbial or algae biomass production are too complicated for small-scale lunar applications. Moreover, while a process of direct solar water splitting appears to be promising, the technology level is too low to be realistic for early lunar missions.

In order to overcome these issues, a water electrolysis and cryogenic hydrogen liquefaction system was developed that can electrolyze water to form oxygen and hydrogen and cryogenically liquefy the oxygen using the hydrogen as the refrigerant. Specifically, the system can comprise an electrolyzer to form oxygen and hydrogen from water. The hydrogen can be directed to an electrochemical compressor where it can, not only increase the pressure of the hydrogen stream, but can also provide the refrigeration power needed to liquefy both the oxygen and hydrogen product stream. A system of expansion valves and heat exchangers can then be configured such that the hydrogen can be used as a refrigerant to liquefy the oxygen.

While there are several options for compression of hydrogen, including piston and turbo mechanical compressors, sorption compressors, and electrochemical compressors, electrochemical compression offers many advantages due to its simplicity, reliability, scalability, and efficiency. The present electrochemical hydrogen compressor can compress the hydrogen formed in the electrolyzer and the hydrogen recycled through the system, for example, from a pressure of 1 bar to a pressure of 100 bar. Advantageously, this compression can be performed absent traditional mechanical means that utilize moving parts that can be noisy, that can vibrate, that can introduce contaminants from improper servicing and maintenance, and that can be inefficient. The specific energy of electrochemical compression of hydrogen can be competitive with commercial compressors, with the added benefit of essentially no routine maintenance requirements or downtime.

There are several distinct advantages of this system compared to the current systems including that the present system is quiet and more efficient than mechanical compression and has the benefit in that it does not need high-speed turbomachinery, pistons with clearance seals, lubrication, or vibration reduction technology. The electrolyzer and compressor can use direct current, thereby reducing electrical integration losses with solar cells. The sum of these and other benefits will likely result in long-term operation of the system without human intervention and with reduced maintenance requirements.

In addition to its ability to be used on Earth, this system has the advantage that it can be used in space, for example, on the Moon, using water extracted from the lunar surface and/or power from a lunar-based photovoltaic array. Additionally, the local thermal environment can be used to pre-cool the propellants, minimizing the power requirements. For example, the system can use novel deep-space radiators to pre-cool the product stream to cryogenic temperatures, and a Joule-Thomson (JT) liquefaction cycle using the hydrogen as a refrigerant to liquefy the oxygen. This system and method have the benefit that it can produce propellant-grade oxygen and hydrogen to permit vehicle launches from the lunar surface.

FIG. 1 is an illustration of a water electrolysis and cryogenic liquefaction system and method that uses a chemical process to produce the hydrogen and oxygen from the water, and a thermodynamic process of cryogenically liquefying the oxygen. In the chemical processing portion of the system, water stream 8 can be introduced to electrolyzer 10, where the water stream 8 can be separated into a separated oxygen stream 12 and a separated hydrogen stream 16 that can be directed to an electrochemical hydrogen compressor 40. The electrochemical hydrogen compressor 40 can compress the separated hydrogen stream 16 to form a compressed hydrogen stream 42. It is noted that the electrolyzer 10 can include one or more electrolyzers as needed. Likewise, the electrochemical hydrogen compressor 40 can include one or more electrochemical compressors as needed. A temperature of the compressed hydrogen stream 42 can be 250 to 400 Kelvin (K), or 250 to 350 K. A pressure of the compressed hydrogen stream 42 can be greater than or equal to 50 bar, or 50 to 200 bar, or 100 to 200 bar.

In the thermodynamic processing portion of the system, the oxygen is cryogenically liquefied using hydrogen as the refrigerant. Here, a portion of the separated oxygen stream 12 can be introduced to a deep space radiator 20 where it is cooled by rejecting heat into the ambient environment. The temperature of the separated oxygen stream 12 can be 200 to 400 K, or 250 to 350 K. A pressure of the separated oxygen stream 12 can be 10 to 50 bar, or 20 to 40 bar. The temperature of the oxygen downstream of the deep space radiator, for example, of cooled oxygen stream 22 can be 100 to 200 K, or 100 to 175 K. A pressure of cooled oxygen stream 22 can be 10 to 50 bar, or 20 to 40 bar. The pressure of the separated oxygen stream 12 and the cooled oxygen stream 22 can be the same or the stream can experience a pressure drop through the deep space radiator 20 such that the cooled oxygen stream 22 has a lower pressure than the separated oxygen stream 12. The deep space oxygen radiator 20 can have at least one of a high emissivity thermal coating or a solar shield to protect against incident solar radiation. The deep space radiator can provide controlled pre-cooling to a temperature of less than or equal to 150 K, or less than or equal to 100 K. The deep space oxygen radiator 20 can have heat exchange surface area of less than or equal to 0.5 meters squared, or 0.05 to 0.3 meters squared. A portion of the oxygen stream 12 can be diverted around the deep space oxygen radiator 20 as by-pass stream 14. The relative amounts of the separated oxygen stream 12 that is introduced to the deep space oxygen radiator 20 versus the amount that is diverted can be optimized to achieve the desired temperature of the cooled oxygen stream 22.

The cooled oxygen stream 22 can be expanded to low pressure and then directed to an oxygen storage tank 30, where a refrigerant hydrogen stream 74 can be used to liquefy the cooled oxygen stream 22 by removing the heat of vaporization to form liquid oxygen. An oxygen expansion valve 28 (which be used in addition to or exchanged with a Joule-Thomson device) can be located upstream of the oxygen storage tank 30. The oxygen expansion valve 28 can reduce the pressure of the cooled oxygen stream 22 via an isentropic process to a pressure of less than or equal to 10 bar, or 0.005 to 5 bar, or 0.05 to 0.5 bar. It is noted that this pressure is merely exemplary and can depend on a desired storage pressure.

A tube can be integrated with the oxygen storage tank 30 to form a cryogenic heat exchanger, where the tube can be configured to remove the heat of vaporization of the cooled oxygen stream 22. A temperature of the oxygen in the oxygen storage tank 30 is not particularly limited, but can be, for example, less than or equal to 100 K, or 45 to 100 K. A volume of the oxygen storage tank 30 is not particularly limiting, but can be, for example, 25 to 150 liters, or 50 to 100 liters. Oxygen can be from the oxygen storage tank via a tank vent valve 32. A portion of the stored oxygen in the oxygen storage tank 30 can be withdrawn as liquid drain 34 for removing the oxygen as desired. Other typical storage tank components such as relief valves, drain and service lines, and instrumentation are not shown in the figure.

Referring back to the hydrogen portion of the thermodynamic processing portion of the system, the compressed hydrogen stream 42 exiting the electrochemical hydrogen compressor 40 can be introduced to one or more recuperative heat exchangers or one or more hydrogen radiators to be precooled prior to being directed to the cryogenic heat exchanger, for example, via hydrogen expansion valve 38 or to a hydrogen storage tank 90 via hydrogen storage expansion valve 88. For example, the compressed hydrogen stream 42 can be introduced to a first recuperative heat exchanger 50 to form a first reduced temperature hydrogen stream 52 by exchanging heat with the low-pressure hydrogen stream. The first recuperative heat exchanger 50 can exchange 150 to 250 Watts. A temperature of the first reduced temperature hydrogen stream 52 can be 150 to 350 K, or 160 to 240 K.

The first reduced temperature hydrogen stream 52 can be directed to a deep space hydrogen radiator 60 to form a radiator-cooled hydrogen stream 62. Similar to the deep space oxygen radiator 20, the deep space hydrogen radiator 60 can have at least one of a high emissivity coating or a solar shield. The deep space hydrogen radiator 60 can have a heat exchange surface area of 0.5 to 5 meters squared. The deep space hydrogen radiator 60 can provide a controlled pre-cooling to a temperature of less than or equal to 180 K, or less than or equal to 150 K, or 120 to 180 K.

The radiator-cooled hydrogen stream 62 can be introduced to a second recuperative heat exchanger 70 to form a further reduced temperature hydrogen stream 72. The second recuperative heat exchanger 70 can exchange 50 to 150 Watts. A temperature of the further reduced temperature hydrogen stream 72 can be 50 to 100 K, or 55 to 80 K.

A first portion of the further reduced temperature hydrogen stream 72 can then be introduced to a hydrogen expansion valve 38 in order to reduce the pressure and form the refrigerant hydrogen stream 74 to provide cooling to the oxygen storage tank 30. The refrigerant hydrogen stream 74 can have a pressure of less than or equal to 10 bar, or 0.005 to 5 bar, or 0.05 to 0.5 bar. The refrigerant hydrogen stream 74 can have a temperature of less than or equal to 100 K, or 20 to 100 K.

The refrigerant hydrogen stream 74 can be directed to the cryogenic heat exchanger and can be used to cool the oxygen in the oxygen storage tank 30. The cryogenic heat exchanger can be a tube-on-tank heat exchanger where the refrigerant hydrogen stream 74 can be coiled around the oxygen storage tank 30. A heat-exchanged hydrogen stream 76 can have an increased temperature as compared to the refrigerant hydrogen stream 74. A temperature of the heat-exchanged hydrogen stream 76 can be 90 to 250 K, or 100 to 200 K.

A second portion of the further reduced temperature hydrogen stream 72 can be introduced to a third recuperative heat exchanger 80 to form a finally reduced temperature hydrogen stream 82. The third recuperative heat exchanger 80 can exchange 10 to 50 Watts. A temperature of the finally reduced temperature hydrogen stream 82 can be 20 to 80 K, or 20 to 45 K. A pressure of the finally reduced temperature hydrogen stream 82 can be greater than or equal to 50 bar, or 50 to 200 bar, or 100 to 200 bar. A pressure of the finally reduced temperature hydrogen stream 82 can be the same as the pressure of the compressed hydrogen stream 42 or the stream can experience a pressure drop through the heat exchangers/radiators such that the cooled streams can have lower pressures after each respective cooling event.

It is noted that the respective recuperative heat exchangers can each independently include one or more tube-in-tube heat exchangers, expanded foam heat exchangers, perforated-plate, or plate-fin heat exchangers. Moreover, the respective recuperative heat exchangers can include one or more recuperative heat exchangers located in series or in parallel.

The finally reduced temperature hydrogen stream 82 can be directed to a hydrogen storage tank 90. A hydrogen storage expansion valve 88 can be located upstream of the hydrogen storage tank 90. The hydrogen storage expansion valve 88 can expand the finally reduced temperature hydrogen stream 82 via an isenthalpic expansion. The hydrogen storage expansion valve 88 can reduce the pressure of the finally reduced temperature hydrogen stream 82, for example, to a pressure of less than or equal to 10 bar, or 0.005 to 5 bar, or 0.05 to 0.5 bar. A temperature of the finally reduced temperature hydrogen stream 82 in the hydrogen storage tank 90 can be 34 and 14 K. A volume of the hydrogen storage tank is not particularly limited, but can be, for example, 100 to 500 liters, or 150 to 350 liters.

The expansion valves 28, 38, and 88 can each independently be a Joule-Thomson (JT) valve or some other expansion device including fixed orifice or line restriction. The expansion valves 28, 38, and 88 can each independently utilize a fixed flow restriction and/or can incorporate heating elements to reduce the risk of clogging. Further, upstream purification units can be added as needed to further mitigate the risk of clogging. For alternative refrigeration cycles including the Claude cycle, isentropic expansion devices such as turbines or pistons can be used.

The respective storage tanks can each independently be free of a vacuum jacket or can be sized to hold approximately 20 days of product from operation of the system. The respective storage tanks can each independently utilize low conductivity supports and multi-layer insulation in order to minimize parasitic heat leak. The respective storage tanks can each independently utilize an axial spray bar to distribute the supplied fluid and to maintain isothermal storage conditions. The respective storage tanks can each independently include an internal temperature rake to obtain stratification and liquid level in the respective tanks. The respective storage tanks can each independently use common cryogenic fluid management devices such as diffusers, fill and drain ports, vent and relief devices, or vaporizers.

A portion of the stored hydrogen in the hydrogen storage tank 90 can be withdrawn as liquid drain 94 for removing the hydrogen as desired. A portion of the stored hydrogen can be withdrawn from the hydrogen storage tank 90 as hydrogen recycle stream 92. Hydrogen recycle stream 92 can be introduced to the third recuperative heat exchanger 80. Heat can flow from the further reduced temperature hydrogen stream 72 (HP stream 72) to the hydrogen recycle stream 92 (LP stream 92) to effectively cool the HP stream 72. The LP stream 92 can exit the third recuperative heat exchanger 80 as a first warmed hydrogen stream 84. The first warmed hydrogen stream 84 can have a temperature of 45 to 80 K, or 50 to 75 K.

The first warmed hydrogen stream 84 and heat-exchanged hydrogen stream 76 can be introduced to the second recuperative heat exchanger 70. Heat can flow from the radiator-cooled hydrogen stream 62 to the first warmed hydrogen stream 84 to effectively cool the radiator-cooled hydrogen stream 62. The first warmed hydrogen stream 84 can exit the second recuperative heat exchanger 70 as a second warmed hydrogen stream 78. The second warmed hydrogen stream 78 can have a temperature of 80 to 210 K, or 90 to 180 K.

The second warmed hydrogen stream 78 can be introduced to the first recuperative heat exchanger 50. Heat can flow from the compressed hydrogen stream 42 to the second warmed hydrogen stream 78 to effectively cool the compressed hydrogen stream 42. The second warmed hydrogen stream 78 can exit the first recuperative heat exchanger 50 as a third warmed hydrogen stream 54. The third warmed hydrogen stream 54 can have a temperature of 200 to 350 K, or 250 to 300 K.

The third warmed hydrogen stream 54 can be combined with the separated hydrogen stream 16 and introduced to the electrochemical hydrogen compressor 40.

It is noted that while FIG. 1 is based on a Joule-Thompson refrigeration cycle, one of skill in the art understands that other refrigeration cycles can be used. For example, the present technology covers a wide variety of other hydrogen refrigerant based cycles including the Claude cycle which uses turboexpanders, dual pressure cycles, multi-stage cycles, and multi-pressure cycles.

Figure 2:
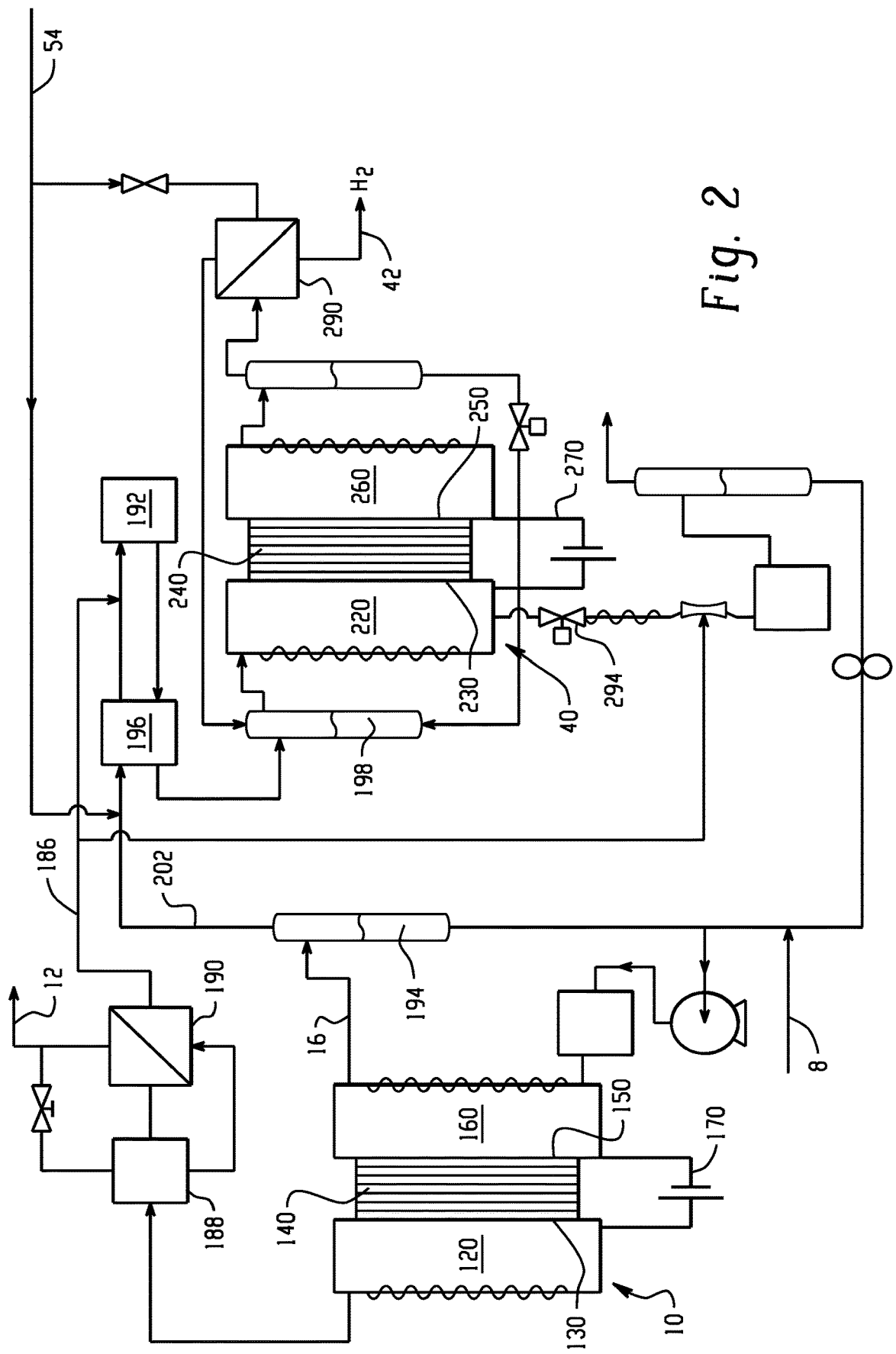
FIG. 2 is an illustration of an aspect of the electrochemical portion of the water electrolysis and cryogenic liquefaction system.

FIG. 2 further illustrates the chemical processing portion of the system. It is noted that while FIG. 2 illustrates the water being fed to the cathode side chamber 160 of the electrolyzer 10, the system can be reconfigured such that the water could be fed to the anode side chamber 120 of the electrolyzer 10. In FIG. 2, water stream 8 can be directed to a cathode side chamber 160 of the electrolyzer 10, where the water can come in contact with an electrolyzer MEA that comprises an electrolyzer proton exchange membrane 140 with catalytic electrodes, electrolyzer anode 130 and electrolyzer cathode 150, located on either side to facilitate the electrochemical half reactions. The water can be transported through the electrolyzer proton exchange membrane 140 and can then contact the electrolyzer anode 130 where it can be separated into oxygen and hydrogen using a small voltage to electrochemically decompose the water into oxygen and hydrogen. The separated oxygen stream 12 can exit the anode side chamber 120 of the electrolyzer 10. The separated oxygen stream 12 can have a pressure of 10 to 40 bar.

At the electrolyzer anode 130, protons that had separated from the water at the anode can be transported back across an electrolyzer proton exchange membrane 140 due to the polarity of the voltage applied and electrons can be bussed through an external circuit. The protons driven through the electrolyzer proton exchange membrane 140 can then be combined at the electrolyzer cathode 150 of the electrolyzer MEA with the electrons being bussed from the external circuit to form molecular hydrogen in the electrolyzer cathode side chamber 160. An amount of water can be transported across the electrolyzer proton exchange membrane 140 that may or may not be removed prior to being directed to the electrochemical hydrogen compressor 40. For example, the separated hydrogen stream 16 can be directed to one or more hydrogen phase separators 194, where the respective buoyancies allow the hydrogen to exit the top of the phase separator and the water to exit from the bottom of the phase separator. The separated hydrogen can be directed to a regenerative heat exchanger 196 to remove waste heat from the electrolysis process before being introduced to the electrochemical hydrogen compressor 40. The separated water can be directed to a heat exchanger (not numbered) before being reintroduced to at least the electrolyzer 10.

At least one of the anode side chamber 120 or the cathode side chamber 160 can comprise at least one of a woven screen or a plate with open channels. At least one of the anode side chamber 120 or the cathode side chamber 160 can comprise an expanded sheet metal that can function as a fluid flow field.

An electrolyzer power source 170 can be used to apply the voltage to the electrolyzer MEA. The applied voltage can be less than or equal to 2 volts (V), or 1.2 to 2 volts, or 1.5 to 2 volts. The power source can be a solar array, a direct current (DC) source, a windmill (if on Earth), a battery (for example, a flow battery), a fuel cell, etc.

The separated oxygen stream 12 can be saturated with water vapor. The separated oxygen stream 12 can be directed to oxygen dryer 190 to remove water from the stream prior to being directed to the deep space oxygen radiator 20. The oxygen dryer 190 can be a membrane-based dryer (such as a hollow fiber membrane dryer). The separated oxygen stream 12 can flow through a heat exchanger 188 before entering the oxygen dryer 190. In the oxygen dryer 190, the separated oxygen stream 12 can flow on the shell side, a purge gas can flow on the inside of the membrane, and the water vapor from separated oxygen stream 12 can diffuse across the membrane for recycling back into the system to form saturated oxygen stream 186. Here, the oxygen can be cooled by expanding a slip stream through a flow restrictor to improve the water removal efficiency of the oxygen dryer 190. After drying, the separated oxygen stream 12 can comprise less than or equal to 30 parts per million by weight of water based on the total weight of the stream.

As shown in FIG. 2, the saturated oxygen stream 186 can be mixed with a hydrogen stream 202 from a hydrogen phase separator 194 and hydrogen from the third warmed hydrogen stream 54 from the liquefaction process. The respective hydrogen streams can be combined in various ways upstream of one or more units as desired. For example, to conserve this water, one or more of the hydrogen streams can be directed to a catalytic reactor 192 to combine any residual oxygen with hydrogen to produce water. One or more of the hydrogen streams can be directed to a regenerative heat exchanger 196 where the gas temperature can be raised above the water saturation temperature before entering the catalytic reactor 192. The concentration of oxygen-in-hydrogen can be less than 2.3 weight percent based on the total weight of the stream at the inlet to the catalytic reactor 192. In the catalytic reactor 192, hydrogen and oxygen can combine to form water vapor. Leaving the catalytic reactor 192, the hydrogen and water stream can be directed to the regenerative heat exchanger 196 where the heat of reaction can heat the incoming hydrogen stream. Leaving the regenerative heat exchanger 196, the hydrogen and water stream can be directed to a low-pressure hydrogen phase separator 198 before the separated hydrogen stream is directed to the electrochemical hydrogen compressor 40. Additionally, hydrogen used to purge the hydrogen dryer 290 can be directed to the low-pressure hydrogen phase separator 198. The hydrogen dryer 290 can be a membrane-based dryer. Instead of expanding product gas and dealing with a cold purge stream, the purge gas can be taken from the hydrogen being returned as third warmed hydrogen stream 54 from the liquefaction process. The purge gas and water vapor from the hydrogen dryer 290 can flow to the low-pressure hydrogen phase separator 198 and can recover as much as 100 weight percent of the water and purge gas.

FIG. 2 illustrates that the separated hydrogen stream 16, the third warmed hydrogen stream 54, and additional hydrogen streams can be directed to a low-pressure chamber 220 of the electrochemical hydrogen compressor 40 to form a hydrogen-rich gas mixture on the anode side of the electrochemical hydrogen compressor 40. The pressure in the low-pressure chamber 220 can be atmospheric, sub-atmospheric, or 0.2 kilopascal (kPa) to 50 megapascal (MPa), or 100 kilopascal to 5 MPa, or 0.1 to 1 MPa. It is noted that the upper limit of the pressure in the low-pressure chamber 220 can be limited by the pressure thresholds of the membrane, where above the pressure threshold mechanical failure of one of the membranes can occur.

The hydrogen-rich gas mixture in the low-pressure chamber 220 can be exposed to a compressor MEA. The compressor MEA can utilize a small voltage to electrochemically compress hydrogen from the low-pressure anode side of the compressor MEA to high pressure at the cathode side of the compressor MEA. The reduction potential of the electrochemical reaction can be characterized by the Nernst equation and can carry an equivalent value to that required for ideal isothermal compression. An additional small voltage can be applied to meet the Ohmic resistance of the compressor proton exchange membrane 240 to accelerate the catalytic effects at the electrodes. Hydrogen can be evolved from the cathode of the cell with water, which is transported across the compressor proton exchange membrane 240 along with the protons. The transported water can emerge from the cathode in liquid form and the high-pressure hydrogen gas can be saturated with water vapor at the operating pressure and temperature of the high-pressure chamber 260.

The hydrogen-rich mixed gas in the low-pressure chamber 220 is in contact with a compressor MEA. The compressor MEA can comprise a compressor proton exchange membrane 240 with catalytic electrodes, compressor anode 230 and compressor cathode 250, located on either side to facilitate the electrochemical half reactions. The hydrogen from the low-pressure chamber 220 that is in contact with the anode can be split into protons and electrons by the electrochemical reaction (1).

$$H_2 \rightarrow 2H^+ + 2e^- \tag{1}$$

The protons formed from the reaction (1) can be driven across the compressor proton exchange membrane 240 due to the polarity of the voltage applied and the electrons formed from reaction (1) can be bussed through an external circuit. The protons driven through the compressor proton exchange membrane 240 can then be combined at the compressor cathode 250 of the compressor MEA with the electrons being bussed from the external circuit by the electrochemical reaction (2).

$$2H^+ + 2e^- \rightarrow H_2 \tag{2}$$

A compressor power source 270 can be used to apply a voltage to the compressor MEA. The applied voltage can be less than or equal to 1 volt (V), or less than or equal to 0.8 volts, less than or equal to 0.5 volts, or 0.01 to 0.2 volts. The power source can be a solar array, a direct current (DC) source, a windmill (if on Earth), a battery (for example, a flow battery), a fuel cell, etc.

FIG. 2 illustrates that the hydrogen can be collected in the high-pressure chamber 260. At least one of the high-pressure chamber 260 or the low-pressure chamber 220 can comprise at least one of a woven screen or a plate with open channels or pores. For example, the low-pressure side of the cell can include a porous plate to provide support to the membrane under the high differential pressure. At least one of the high-pressure chamber 260 or the low-pressure chamber 220 can comprise an expanded sheet metal that can function as a fluid flow field.

The reformed hydrogen can be saturated with water vapor at the temperature and pressure of the high-pressure chamber 260. The pressure in the high-pressure chamber 260 can be 5 to 100 MPa, or 10 to 50 MPa, or 10 to 20 MPa, where it is noted that the maximum pressure in the high-pressure chamber 260 can be limited merely by the mechanical robustness of the high-pressure chamber 260 and ability of the compressor MEA to withstand the pressure differential across the compressor proton exchange membrane 240.

An amount of condensed water in liquid form can be recovered from the high-pressure chamber 260 via a phase separated located upstream of the hydrogen dryer 290. The condensed water can be recycled, for example, by introducing the recovered water from the hydrogen dryer 290 to the electrochemical hydrogen compressor 40. Here, the humidified hydrogen coming off of the hydrogen dryer 290 can be delivered to the phase separator 198 and dry hydrogen 42 can be delivered to the first recuperative heat exchanger 50.

The electrochemical hydrogen compressor 40 can further comprise a bleed system that can remove dissolved gases and any non-dissolved gasses that cannot be pumped (for example, nitrogen or hydrogen). For example, the anode side of the electrochemical hydrogen compressor 40 can incorporate a bleed provision 294. If the concentration of a gas originally dissolved in the feed water, such as nitrogen, increases, the bleed provision 294 can vent it from the subsystem. For example, the hydrogen that is in the bleed stream can be combined with oxygen that is introduced through an ejector and fed to a catalytic oxidizer and liquid water can be collected and returned to the electrolyzer 10 via a pump. Inerts and a small amount of water vapor can be vented from the bleed provision 294.

The electrodes (electrolyzer anode 130, electrolyzer cathode 150, compressor anode 230, or compressor cathode 250) can each independently be in direct physical contact with the respective proton exchange membrane and can cover 90 to 100% of the respective surface areas of the proton exchange membrane. Each electrode independently can comprise a catalyst layer. The catalyst layer can comprise at least one of platinum, palladium, rhodium, carbon, gold, tantalum, tungsten, ruthenium, iridium, osmium, or silver. The catalyst can comprise a bound catalyst. The binder can comprise at least one of a fluoropolymer or a particulate carbon. The catalyst and optional binder can be deposited directly onto the surfaces of the proton exchange membrane. The catalyst can be disposed on a gas diffusion layer such that it is located throughout the gas diffusion layer or on a surface of the gas diffusion layer that is in contact with the proton exchange membrane. The gas diffusion layer can be porous. The gas diffusion layer can be a mesh. The gas diffusion layer can comprise a graphitic material. The gas diffusion layer can comprise a plurality of fibers such as carbon fibers. The gas diffusion layer can be electrically conductive.

The respective proton exchange membranes can each independently comprise an electrolyte such as at least one of a proton conducting ionomer or an ion exchange resin. The proton conducting ionomer can comprise a polymer complexed with at least one of an alkali metal salt, an alkali earth metal salt, a protonic acid, or a protonic acid salt. The complexed polymer can comprise at least one of a polyether, polyester, polyimide, or a polyoxyalkylene (such as poly (ethylene glycol), poly(ethylene glycol monoether), or poly (ethylene glycol diether)).

The compressor proton exchange membrane 240 of the electrochemical hydrogen compressor 40 can comprise the same or different material as that of the electrolyzer proton exchange membrane 140 of the electrolyzer 10. For example, the respective proton exchange membranes can each independently comprise an ionomer-type polyelectrolyte comprising an amount of ionic groups on a hydrophobic backbone or on pendant groups off of the hydrophobic backbone such as a hydrocarbon- and fluorocarbon-type resin. The hydrocarbon-type ion-exchange resin can comprise at least one of a phenolic resin or a polystyrene. The hydrocarbon-type ion-exchange resin can be sulfonated, for example, a sulfonated poly(xylylene oxide). The hydrocarbon-type ion-exchange resin can comprise a proton conducting molecule, for example, at least one of a fullerene molecule, a carbon fiber, or a carbon nanotube. The proton conducting molecules can comprise proton dissociation groups, for example, at least one of —$OSO_3H$, —$OPO(OH)_2$, —COOH, —OH, —$SO_3H$, —$C_6H_4$, or —$SO_3H$. The proton conducting molecules alone can form the proton exchange membrane or can be present as a mixture with a binder polymer such as at least one of a fluoropolymer (for example, polyfluoroethylene (such as polytetrafluoroethylene) or poly(vinylidene fluoride)) or poly(vinyl alcohol). As oxygen is not present in a significant amount in the proton exchange membrane in the electrochemical hydrogen compressor 40, the concern for oxidation is low, and the proton exchange membrane can comprise a hydrocarbon-type ion-exchange resin.

The fluorocarbon-type ion-exchange resin can include a hydrate of at least one of tetrafluoroethylene-perfluorosulfonyl ethoxyvinyl ether or tetrafluoroethylene-hydroxylated (perfluoro vinyl ether) copolymer. The fluorocarbon-type ion-exchange resin can have at least one of a sulfonic, a carboxylic, or a phosphoric acid functionality. The fluorocarbon-type ion-exchange resin can be a sulfonated fluoropolymer (such as a lithium salt of perfluoroethylene sulfonic acid). An example of fluorocarbon-type ion-exchange resin is Nafion™ that is commercially available from DuPont.

Set forth below are non-limiting aspects of the present disclosure.

Aspect 1: A water electrolysis and cryogenic hydrogen liquefaction system, comprising: a water stream in fluid communication with an anode side chamber of an electrolyzer; the electrolyzer comprising the anode side chamber, a cathode side chamber, and an electrolyzer membrane and electrode assembly located between the anode side chamber and the cathode side chamber; a deep space oxygen radiator in fluid communication with the anode side chamber of the electrolyzer via a separated oxygen stream; a cryogenic heat exchanger comprising an oxygen storage tank in fluid communication with the deep space oxygen radiator via a cooled oxygen stream; an electrochemical hydrogen compressor in fluid communication with the cathode side chamber via a separated hydrogen stream; a hydrogen storage tank in fluid communication with the electrochemical hydrogen compressor via a cooled hydrogen stream that is cooled by at least one recuperative heat exchanger and at least one deep space hydrogen radiator; wherein at least a portion of the cooled hydrogen stream is in a first fluid communication with an expansion valve and the cryogenic heat exchanger that is located downstream of the expansion valve; wherein the hydrogen storage tank is in a second fluid communication with the electrochemical hydrogen compressor via a warmed hydrogen stream that is warmed by the at least one recuperative heat exchanger; and wherein the cryogenic heat exchanger is in fluid communication with the warmed hydrogen stream via a heat-exchanged hydrogen stream.

Aspect 2: The system of Aspect 1, wherein the electrochemical hydrogen compressor comprises a low-pressure chamber, a high-pressure chamber, and a compressor membrane and electrode assembly located between the low-pressure chamber and the high-pressure chamber; wherein the separated hydrogen stream is in fluid communication with the low-pressure chamber and wherein the cooled hydrogen stream is in fluid communication with the high-pressure chamber.

Aspect 3: The system of any one or more of the preceding aspects, wherein the expansion valve is a Joule-Thomson valve.

Aspect 4: The system of any one or more of the preceding aspects, further comprising an oxygen expansion valve located along the cooled oxygen stream upstream of the oxygen storage tank; wherein the oxygen expansion valve is optionally a Joule-Thomson valve.

Aspect 5: The system of any one or more of the preceding aspects, further comprising a hydrogen storage expansion valve located along the cooled hydrogen stream upstream of the hydrogen storage tank; wherein the hydrogen storage expansion valve is optionally a Joule-Thomson valve.

Aspect 6: The system of any one or more of the preceding aspects, wherein the at least one recuperative heat exchanger includes a first recuperative heat exchanger, a second recuperative heat exchanger, and a third recuperative heat exchanger; wherein the first recuperative heat exchanger is in first fluid communication with the electrochemical hydrogen compressor via a compressed hydrogen stream; wherein the deep space hydrogen radiator is in first fluid communication with the first recuperative heat exchanger via a first reduced temperature hydrogen stream; wherein the second recuperative heat exchanger is in first fluid communication with the deep space hydrogen radiator via a radiator-cooled hydrogen stream; and wherein the third recuperative heat exchanger is in first fluid communication with the second recuperative heat exchanger via a further reduced temperature hydrogen stream; wherein the hydrogen storage tank is in first fluid communication with the third recuperative heat exchanger via a finally reduced temperature hydrogen stream; and wherein the cooled hydrogen stream includes the compressed hydrogen stream, the first reduced temperature hydrogen stream, the radiator-cooled hydrogen stream, the further reduced temperature hydrogen stream, and the finally reduced temperature hydrogen stream.

Aspect 7: The system of Aspect 6, wherein the warmed hydrogen stream includes a hydrogen recycle stream, a first warmed hydrogen stream, a second warmed hydrogen stream, and a third warmed hydrogen stream; wherein the hydrogen storage tank is in second fluid communication with the third recuperative heat exchanger via the hydrogen recycle stream; wherein the third recuperative heat exchanger is in second fluid communication with the second recuperative heat exchanger via the first warmed hydrogen stream; wherein the second recuperative heat exchanger is in second fluid communication with the first recuperative heat exchanger via the second warmed hydrogen stream; and wherein the first recuperative heat exchanger is in second fluid communication with the electrochemical hydrogen compressor via the third warmed hydrogen stream.

Aspect 8: The system of any one or more of the preceding aspects, further comprising a dryer located along the separated oxygen stream upstream of the deep space oxygen radiator.

Aspect 9: The system of any one or more of the preceding aspects, further comprising a catalytic reactor in fluid communication with at least one recuperative heat exchanger or the electrolyzer and also with the electrochemical hydrogen compressor.

Aspect 10: The system of any one or more of the preceding aspects, wherein the cryogenic heat exchanger is a shell in tube heat exchanger.

Aspect 11: A method for electrolyzing water and cryogenically forming liquid oxygen therefrom, for example, using any one or more of the systems of the preceding aspects comprising: directing a water stream to at least one of an anode side chamber or a cathode side chamber of an electrolyzer; the electrolyzer comprising the anode side chamber, the cathode side chamber, and an electrolyzer membrane and electrode assembly located between the anode side chamber and the cathode side chamber; directing a separated oxygen stream from the anode side chamber of the electrolyzer to a deep space oxygen radiator; directing a cooled oxygen stream from the deep space oxygen radiator to an oxygen storage tank of a cryogenic heat exchanger; directing a separated hydrogen stream from the cathode side chamber to an electrochemical hydrogen compressor; directing a cooled hydrogen stream from the electrochemical hydrogen compressor to a hydrogen storage tank and cooling the cooled hydrogen stream in at least one recuperative heat exchanger and at least one deep space hydrogen radiator upstream of the hydrogen storage tank; expanding at least a portion of the cooled hydrogen stream in an expansion valve to form a refrigerant hydrogen stream and directing the refrigerant hydrogen stream to the cryogenic heat exchanger; directing a warmed hydrogen stream from hydrogen storage tank to the electrochemical hydrogen compressor and warming the warmed hydrogen stream via at least one recuperative heat exchanger; and directing a heat-exchanged hydrogen stream from the cryogenic heat exchanger to the warmed hydrogen stream upstream of the electrochemical hydrogen compressor.

Aspect 12: The method of Aspect 11, wherein the electrochemical hydrogen compressor comprises a low-pressure chamber, a high-pressure chamber, and a compressor membrane and electrode assembly located between the low-pressure chamber and the high-pressure chamber; wherein the method comprises directing the separated hydrogen stream to the low-pressure chamber and directing the cooled hydrogen stream from the high-pressure chamber.

Aspect 13: The method of any one or more of Aspects 11 to 12, wherein the expansion valve is a Joule-Thomson valve.

Aspect 14: The method of any one or more of Aspects 11 to 13, further comprising expanding the cooled oxygen stream upstream of the oxygen storage tank via an oxygen expansion valve; wherein the oxygen expansion valve is optionally a Joule-Thomson valve.

Aspect 15: The method of any one or more of Aspects 11 to 14, further comprising expanding the cooled hydrogen stream upstream of the hydrogen storage tank via a hydrogen storage expansion valve; wherein the oxygen expansion valve is optionally a Joule-Thomson valve.

Aspect 16: The method of any one or more of Aspects 11 to 15, wherein at least one recuperative heat exchanger includes a first recuperative heat exchanger, a second recuperative heat exchanger, and a third recuperative heat exchanger; and wherein the method further comprises: cooling a compressed hydrogen stream in the first recuperative heat exchanger to form a first reduced temperature hydrogen stream; cooling the first reduced temperature hydrogen stream in the deep space hydrogen radiator to form a radiator-cooled hydrogen stream; cooling the radiator-cooled hydrogen stream in the second recuperative heat exchanger to form a further reduced temperature hydrogen stream; and cooling the further reduced temperature hydrogen stream in the third recuperative heat exchanger to form a finally reduced temperature hydrogen stream; wherein the cooled hydrogen stream includes the compressed hydrogen stream, the first reduced temperature hydrogen stream, the radiator-cooled hydrogen stream, the further reduced temperature hydrogen stream, and the finally reduced temperature hydrogen stream.

Aspect 17: The method of Aspect 16, wherein the warmed hydrogen stream includes a hydrogen recycle stream, a first warmed hydrogen stream, a second warmed hydrogen stream, and a third warmed hydrogen stream; and wherein the method further comprises: removing the hydrogen recycle stream from the hydrogen storage tank; warming the hydrogen recycle stream in the third recuperative heat exchanger to form the first warmed hydrogen stream; warming the first warmed hydrogen stream in the second recuperative heat exchanger to form the second warmed hydrogen stream; warming the second warmed hydrogen stream in the first recuperative heat exchanger to form the third warmed hydrogen stream; and directing the third warmed hydrogen stream to the electrochemical hydrogen compressor.

Aspect 18: The method of any one or more of Aspects 11 to 17, further comprising drying the separated oxygen stream in a dryer prior to directing the separated oxygen stream to the deep space oxygen radiator.

Aspect 19: The method of any one or more of Aspects 11 to 18, further comprising directing the warmed hydrogen stream or a separated water vapor stream from the separated oxygen stream to a catalytic reactor to form a reduced oxygen stream; and directing the reduced oxygen stream to the electrochemical hydrogen compressor.

Aspect 20: The method of any one or more of Aspects 11 to 19, wherein the cryogenic heat exchanger is a shell in tube heat exchanger.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "at least one of" means that the list is inclusive of each element individually, as well as combinations of two or more elements of the list, and combinations of at least one element of the list with like elements not named. Also, the term "combination" is inclusive of blends, mixtures, alloys, reaction products, and the like.

The term "or" means "and/or" unless clearly indicated otherwise by context. Reference throughout the specification to "an aspect", "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A water electrolysis and cryogenic hydrogen liquefaction system, comprising:
    a water stream in fluid communication with an anode side chamber of an electrolyzer; the electrolyzer comprising the anode side chamber, a cathode side chamber, and an electrolyzer membrane and electrode assembly located between the anode side chamber and the cathode side chamber;
    a deep space oxygen radiator in fluid communication with the anode side chamber of the electrolyzer via a separated oxygen stream;
    a cryogenic heat exchanger comprising an oxygen storage tank in fluid communication with the deep space oxygen radiator via a cooled oxygen stream;
    an electrochemical hydrogen compressor in fluid communication with the cathode side chamber via a separated hydrogen stream;
    a hydrogen storage tank in fluid communication with the electrochemical hydrogen compressor via a cooled hydrogen stream that is cooled by at least one recuperative heat exchanger and at least one deep space hydrogen radiator;
    wherein at least a portion of the cooled hydrogen stream is in a first fluid communication with an expansion valve and the cryogenic heat exchanger that is located downstream of the expansion valve;
    wherein the hydrogen storage tank is in a second fluid communication with the electrochemical hydrogen compressor via a warmed hydrogen stream that is warmed by the at least one recuperative heat exchanger; and
    wherein the cryogenic heat exchanger is in fluid communication with the warmed hydrogen stream via a heat-exchanged hydrogen stream.

2. The system of claim 1, wherein the electrochemical hydrogen compressor comprises a low-pressure chamber, a high-pressure chamber, and a compressor membrane and electrode assembly located between the low-pressure chamber and the high-pressure chamber; wherein the separated hydrogen stream is in fluid communication with the low-pressure chamber and wherein the cooled hydrogen stream is in fluid communication with the high-pressure chamber.

3. The system of claim 1, wherein the expansion valve is a Joule-Thomson valve.

4. The system of claim 1, further comprising an oxygen expansion valve located along the cooled oxygen stream upstream of the oxygen storage tank; wherein the oxygen expansion valve is optionally a Joule-Thomson valve.

5. The system of claim 1, further comprising a hydrogen storage expansion valve located along the cooled hydrogen stream upstream of the hydrogen storage tank; wherein the hydrogen storage expansion valve is optionally a Joule-Thomson valve.

6. The system of claim 1, wherein the at least one recuperative heat exchanger includes a first recuperative heat exchanger, a second recuperative heat exchanger, and a third recuperative heat exchanger;
    wherein the first recuperative heat exchanger is in the first fluid communication with the electrochemical hydrogen compressor via a compressed hydrogen stream;
    wherein the deep space hydrogen radiator is in the first fluid communication with the first recuperative heat exchanger via a first reduced temperature hydrogen stream;
    wherein the second recuperative heat exchanger is in the first fluid communication with the deep space hydrogen radiator via a radiator-cooled hydrogen stream; and
    wherein the third recuperative heat exchanger is in the first fluid communication with the second recuperative heat exchanger via a further reduced temperature hydrogen stream;
    wherein the hydrogen storage tank is in the first fluid communication with the third recuperative heat exchanger via a finally reduced temperature hydrogen stream; and
    wherein the cooled hydrogen stream includes the compressed hydrogen stream, the first reduced temperature hydrogen stream, the radiator-cooled hydrogen stream, the further reduced temperature hydrogen stream, and the finally reduced temperature hydrogen stream.

7. The system of claim 6, wherein the warmed hydrogen stream includes a hydrogen recycle stream, a first warmed hydrogen stream, a second warmed hydrogen stream, and a third warmed hydrogen stream;
    wherein the hydrogen storage tank is in the second fluid communication with the third recuperative heat exchanger via the hydrogen recycle stream;
    wherein the third recuperative heat exchanger is in the second fluid communication with the second recuperative heat exchanger via the first warmed hydrogen stream;
    wherein the second recuperative heat exchanger is in the second fluid communication with the first recuperative heat exchanger via the second warmed hydrogen stream; and
    wherein the first recuperative heat exchanger is in the second fluid communication with the electrochemical hydrogen compressor via the third warmed hydrogen stream.

8. The system of claim 1, further comprising a dryer located along the separated oxygen stream upstream of the deep space oxygen radiator.

9. The system of claim 1, further comprising a catalytic reactor in fluid communication with the at least one regenerative heat exchanger or the electrolyzer and the electrochemical hydrogen compressor.

10. The system of claim 1, wherein the cryogenic heat exchanger is a shell in tube heat exchanger.

11. A method for electrolyzing water and cryogenically forming liquid oxygen therefrom, comprising:
    directing a water stream to at least one of an anode side chamber or a cathode side chamber of an electrolyzer; the electrolyzer comprising the anode side chamber, the cathode side chamber, and an electrolyzer membrane and electrode assembly located between the anode side chamber and the cathode side chamber;

directing a separated oxygen stream from the anode side chamber of the electrolyzer to a deep space oxygen radiator;

directing a cooled oxygen stream from the deep space oxygen radiator to an oxygen storage tank of a cryogenic heat exchanger;

directing a separated hydrogen stream from the cathode side chamber to an electrochemical hydrogen compressor;

directing a cooled hydrogen stream from the electrochemical hydrogen compressor to a hydrogen storage tank and cooling the cooled hydrogen stream in at least one recuperative heat exchanger and at least one deep space hydrogen radiator upstream of the hydrogen storage tank;

expanding at least a portion of the cooled hydrogen stream in an expansion valve to form a refrigerant hydrogen stream and directing the refrigerant hydrogen stream to the cryogenic heat exchanger;

directing a warmed hydrogen stream from the hydrogen storage tank to the electrochemical hydrogen compressor and warming the warmed hydrogen stream via the at least one recuperative heat exchanger; and directing a heat-exchanged hydrogen stream from the cryogenic heat exchanger to the warmed hydrogen stream upstream of the electrochemical hydrogen compressor.

12. The method of claim 11, wherein the electrochemical hydrogen compressor comprises a low-pressure chamber, a high-pressure chamber, and a compressor membrane and electrode assembly located between the low-pressure chamber and the high-pressure chamber; wherein the method comprises directing the separated hydrogen stream to the low-pressure chamber and directing the cooled hydrogen stream from the high-pressure chamber.

13. The method of claim 11, wherein the expansion valve is a Joule-Thomson valve.

14. The method of claim 11, further comprising expanding the cooled oxygen stream upstream of the oxygen storage tank via an oxygen expansion valve; wherein the oxygen expansion valve is optionally a Joule-Thomson valve.

15. The method of claim 11, further comprising expanding the cooled hydrogen stream upstream of the hydrogen storage tank via a hydrogen storage expansion valve; wherein the hydrogen expansion valve is optionally a Joule-Thomson valve.

16. The method of claim 11, wherein the at least one recuperative heat exchanger includes a first recuperative heat exchanger, a second recuperative heat exchanger, and a third recuperative heat exchanger; and wherein the method further comprises:

cooling a compressed hydrogen stream in the first recuperative heat exchanger to form a first reduced temperature hydrogen stream;

cooling the first reduced temperature hydrogen stream in the deep space hydrogen radiator to form a radiator-cooled hydrogen stream;

cooling the radiator-cooled hydrogen stream in the second recuperative heat exchanger to form a further reduced temperature hydrogen stream; and cooling the further reduced temperature hydrogen stream in the third recuperative heat exchanger to form a finally reduced temperature hydrogen stream;

wherein the cooled hydrogen stream includes the compressed hydrogen stream, the first reduced temperature hydrogen stream, the radiator-cooled hydrogen stream, the further reduced temperature hydrogen stream, and the finally reduced temperature hydrogen stream.

17. The method of claim 16, wherein the warmed hydrogen stream includes a hydrogen recycle stream, a first warmed hydrogen stream, a second warmed hydrogen stream, and a third warmed hydrogen stream; and wherein the method further comprises:

removing the hydrogen recycle stream from the hydrogen storage tank;

warming the hydrogen recycle stream in the third recuperative heat exchanger to form the first warmed hydrogen stream;

warming the first warmed hydrogen stream in the second recuperative heat exchanger to form the second warmed hydrogen stream;

warming the second warmed hydrogen stream in the first recuperative heat exchanger to form the third warmed hydrogen stream; and directing the third warmed hydrogen stream to the electrochemical hydrogen compressor.

18. The method of claim 11, further comprising drying the separated oxygen stream in a dryer prior to directing the separated oxygen stream to the deep space oxygen radiator.

19. The method of claim 11, further comprising directing at least one of the warmed hydrogen stream or a separated water vapor stream from the separated oxygen stream to a catalytic reactor to form a reduced oxygen stream; and directing the reduced oxygen stream to the electrochemical hydrogen compressor.

20. The method of claim 11, wherein the cryogenic heat exchanger is a shell in tube heat exchanger.

* * * * *